(12) United States Patent
Johnson

(10) Patent No.: US 11,850,782 B2
(45) Date of Patent: Dec. 26, 2023

(54) CONTROLLING FILLING AT LEAST ONE CAVITY USING AN IN-MOLD SWITCH

(71) Applicant: Nicholas C. Johnson, Waterford, PA (US)

(72) Inventor: Nicholas C. Johnson, Waterford, PA (US)

(73) Assignee: Innovative Molding Products Company, Waterford, PA (US)

(*) Notice: Subject to any disclaimer, the term of this patent is extended or adjusted under 35 U.S.C. 154(b) by 0 days.

(21) Appl. No.: 17/053,030

(22) PCT Filed: May 3, 2019

(86) PCT No.: PCT/US2019/030662
§ 371 (c)(1),
(2) Date: Nov. 4, 2020

(87) PCT Pub. No.: WO2019/213568
PCT Pub. Date: Nov. 7, 2019

(65) Prior Publication Data
US 2021/0229334 A1  Jul. 29, 2021

Related U.S. Application Data

(60) Provisional application No. 62/667,223, filed on May 4, 2018.

(51) Int. Cl.
*B29C 45/77* (2006.01)

(52) U.S. Cl.
CPC .... *B29C 45/77* (2013.01); *B29C 2945/76006* (2013.01); *B29C 2945/7611* (2013.01); *B29C 2945/76257* (2013.01); *B29C 2945/76381* (2013.01)

(58) Field of Classification Search
CPC  B29C 2945/76006; B29C 2945/76257; B29C 2945/76381; B29C 45/77; B29C 2945/7626; B29C 2945/76264; B29C 2945/76287; B29C 2945/76478; B29C 2945/7624; B29C 2945/76244; B29C 2945/76274
See application file for complete search history.

(56) References Cited

U.S. PATENT DOCUMENTS

| | | | |
|---|---|---|---|
| 6,345,974 B1 * | 2/2002 | Kawasaki | B29C 45/401 425/149 |
| 2006/0197247 A1 | 9/2006 | Speight | |
| 2006/0237874 A1 | 10/2006 | Kurihara et al. | |
| 2011/0254183 A1 | 10/2011 | Maris-Haug et al. | |
| 2016/0185023 A1 | 6/2016 | Lee et al. | |
| 2018/0001531 A1 | 1/2018 | Lawless, III et al. | |
| 2018/0003575 A1 | 1/2018 | Pollard et al. | |

* cited by examiner

*Primary Examiner* — Yunju Kim

(57) ABSTRACT

A system and method for determining the position of a flow of melt within an injection molding system comprises a switch and a pin that actuates the switch. The pin has a first end positioned closer to the anticipated flow path of the melt and a second end that is positioned to be in contact with the switch, such that when melt enters the anticipated flow path, the pin is pushed to activate the switch.

21 Claims, 3 Drawing Sheets

CONTROLLING FILLING AT LEAST ONE CAVITY USING AN IN-MOLD SWITCH

BACKGROUND

In injection molding machines, melted plastic (the "melt") is introduced under pressure using an injection screw or plunger that pushes the melt to a mold that has a cavity or multiple cavities to create a final molded product. Many systems and methods are used to influence the uniformity and consistency of the molded product. These standard systems and methods do not compensate for fluctuations in the molding machine, mold, and melt. In addition, the same systems and methods can be used to trigger other transitions during the cavity filling process. Pressure, temperature, or other types of sensors are sometimes used to monitor the injection molding machine, and the process or tooling can be altered, manually or automatically, to achieve a flow balance in all cavities. A disadvantage of using sensors is the cost of the sensors, the electronics to condition the signal from the sensor, and the controller to signal that the sensed value has reached the actuation level or change in condition. The systems and methods disclosed herein reduce fluctuations in the quality of injection molded products substantially better than standard systems and methods and at a substantially lower cost than is incurred with the use of in-mold sensors.

SUMMARY

What is presented is a system and method for determining the position of a flow of melt within an injection molding system. The system comprises a switch and a pin that actuates the switch. The pin has a first end positioned closer to the anticipated flow path of the melt and a second end that is positioned to be in contact with the switch such that when melt enters the anticipated flow path, said pin is pushed to activate said switch.

In various embodiments, the first end is located within the anticipated flow path of the melt. The first end may be in contact with another movable element that is within the anticipated flow path of the melt. The pin may be an ejector pin or any other pin in the injection molding system and may be located within a mold cavity or along a runner system.

In some embodiments, the pin moves 0.15 mm to activate the switch. The switch may actuate various functions such as to close or open a circuit to trigger an event, to trigger a velocity to pressure transfer, to trigger a relay to control outputs from the relay, or to close or open a circuit to trigger opening or closing valve gate pins in a hot runner mold.

The method for determining the position of a flow of melt within an injection molding system comprises locating a pin having a first end and a second end to actuate a switch by positioning the first end closer to the anticipated flow path of the melt and the second end in contact with the switch such that when melt enters the anticipated flow path, the pin is pushed to activate the switch.

In various embodiments, the first end is located within the anticipated flow path of the melt. The first end may be in contact with another movable element that is within the anticipated flow path of the melt. The pin may be an ejector pin or any other pin in the injection molding system and may be located within a mold cavity or along a runner system.

In some embodiments, the pin moves 0.15 mm to activate the switch. The switch may actuate various functions such as to close or open a circuit to trigger an event, to trigger a velocity to pressure transfer, to trigger a relay to control outputs from the relay, or to close or open a circuit to trigger opening or closing valve gate pins in a hot runner mold.

Those skilled in the art will realize that this invention is capable of embodiments that are different from those shown and that details of the devices and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

DETAILED DESCRIPTION

Figure 1A:
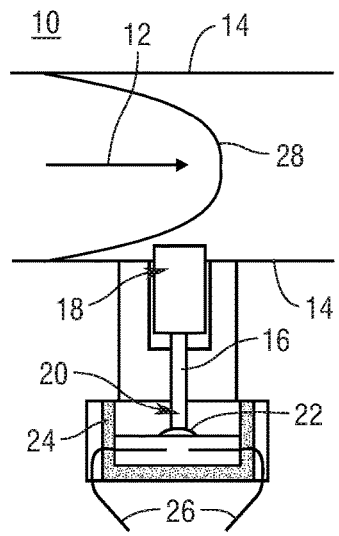
FIG. 1A is a cross-sectional view of a system for determining the position of a flow of melt within an injection molding system with the switch in the open position.

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

In injection molding machines, melted plastic (the "melt") is introduced under pressure using an injection screw or plunger that pushes the melt to a mold that has a cavity or multiple cavities to create a final molded product. The melt is placed under a holding pressure toward the end or at the end of its flow path. To influence the uniformity and consistency of the molded product, it is known that the changeover point to the holding pressure should remain as consistent as possible. The standard system and method of changing over to holding pressure is based on molding machine conditions only. The travel or position of the injection screw/plunger, the time that the screw/plunger has been pushed, or the pressure that it takes to push the melt are also common options to affect changeover to holding pressure. These standard systems and methods do not compensate for fluctuations in the molding machine, mold, and melt.

In addition to controlling the changeover to holding pressure, the same systems and methods can be used to trigger other transitions during the cavity filling process. Pressure, temperature, or other types of sensors are sometimes used to detect when each individual cavity in a multiple cavity mold is being filled. These signals can be monitored, and the process or tooling can be altered, manually or automatically, to achieve a flow balance in all cavities. Pressure, temperature, or other types of sensors are sometimes used with molds that contain multiple valve gates in order to determine when each valve gate should be opened or closed. Multiple sensors are sometimes placed in molds to monitor or control the tine that it takes for the melt to flow from one sensor to the next. A disadvantage of using sensors is the cost of the sensors, the electronics to condition the signal from the sensor, and the controller to signal that the sensed value has reached the actuation level or change in condition. The systems and methods disclosed herein reduce fluctuations in the quality of injection molded products at a substantially lower cost than is incurred with the use of in-mold sensors.

The system and method presented to determine the position of a flow of melt within an injection molding system to address the process analytics presented above is achieved by using a switch in the mold that changes state (opened or closed) when the melt flows over it to either close or open an electronic circuit to control the melt flow in the mold. This switch can be placed in the mold cavity or behind a pin in the mold cavity where needed to affect changeover to holding pressure, signal a valve gate to open or close, or make an adjustment to the process or tooling. Alternatively, the switch can be placed prior to where actuation needs to occur and a delay timer, relay or otherwise, can be used to actuate the appropriate system or process. Alternately, the switch can be placed prior to where actuation of a system or process needs to occur, and the actuation can be delayed by the amount of movement of the injection screw/plunger past where the switch is actuated. Multiple switches can be placed in mold cavities if the goal is to monitor or control the balance of multiple cavities or to monitor the time that the melt takes to flow from one switch to the next.

Figure 1B:
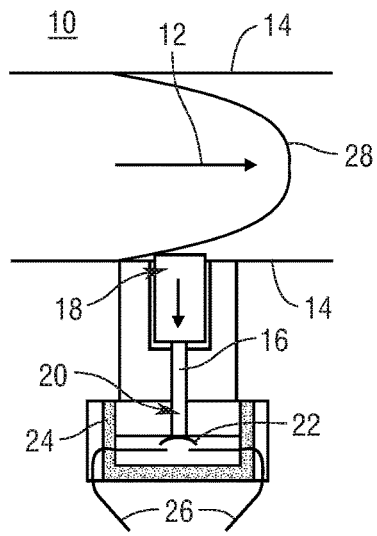
FIG. 1B is the system of FIG. 1A in an intermediate position.
Figure 1C:
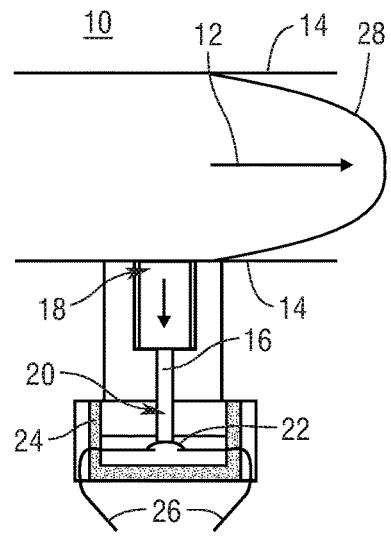
FIG. 1C is the system of FIG. 1A with the switch in the closed position.

FIGS. 1A, 1B, and 1C illustrates the system 10 and method for determining the position of a flow of melt 12 within two cavity mold surfaces 14 of an injection molding system. A pin 16 having a first end 18 and a second end 20 is located within the system. The first end 18 is located within the system 10 and positioned closer to of within the anticipated flow path of the melt 12. The second end 20 is positioned to be in contact with a switch 22. In the embodiment depicted, the switch 22 is positioned in the open position of a circuit. The conductive path of the switch 22 is electrically isolated by an internal plastic insulator 24 and further by plastic coated wires 26 coming out of the switch 22. As shown in FIG. 1B, as the leading edge 28 of the flow of melt 12 moves over the first end 18 of the pin 16, it pushes the pin 16 down onto the switch 22 as it flows over the top of the first end 18 of the pin 16 or shortly thereafter. In the final position, depicted in FIG. 1C, the closed switch makes it possible to create a circuit through the wires 26.

The pin 16 can be located anywhere in the injection molding system where a flow of melt 12 is anticipated such as a mold cavity or along a runner system. Preferably, the surface of the first end 18 of the pin 16 should be flush with the cavity mold surface 14 when actuated. The distance that the pin 16 moves to actuate the switch 22 can be 0.15 mm but in any case, any distance sufficient to actuate the switch 22 to which it is in contact.

The wires 26 may be connected directly to a molding machine capable of using an external signal to changeover to holding pressure, opening or closing valve gate pins in a hot runner mold, control or monitor some other aspect of filling the mold, triggers a relay to control outputs from the relay, or trigger an event such as a velocity to pressure transfer. Alternately, the wires 26 may be connected to an external data acquisition or control unit that is used to monitor or control the filling process.

Any number of these systems 10 may be incorporated in various parts of the injection molding machine to monitor and control various aspects of the molding process.

Figure 2A:
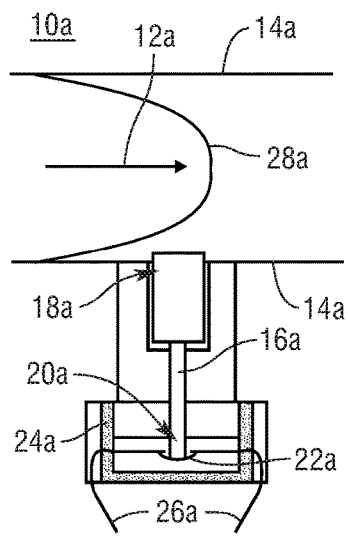
FIG. 2A is a cross-sectional view of another embodiment of a system for determining the position of a flow of melt within an injection molding system with the switch in the closed position.
Figure 2B:
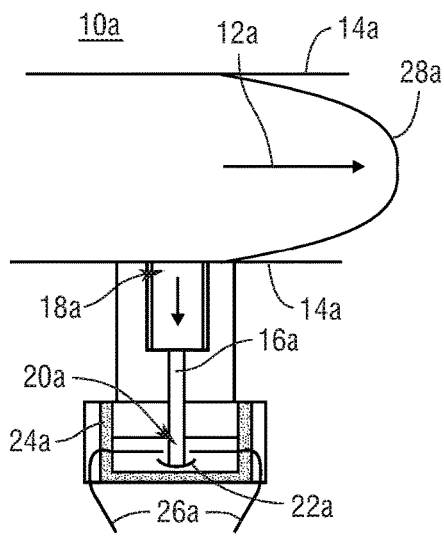
FIG. 2B is the system of FIG. 2A with the switch in the open position.

FIGS. 2A and 2B illustrate a variation of the system 10a and method disclosed above in which the actuation of a pin 16a actuates a switch 22a from a closed position to an open position. As with the earlier embodiment, the system 10a is in anticipated flow of melt 12a within two cavity mold surfaces 14a of an injection molding system. The pin 16a having a first end 18a and a second end 20a is located within the system. The first end 18a is positioned closer to or within the anticipated flow path of the melt 12a. The second end 20a is positioned to be in contact with the switch 22a. In the embodiment depicted, the switch 22a is positioned in the closed position of a circuit and is actively sending a monitored signal. The conductive path of the switch 22a is electrically isolated by an internal plastic insulator 24a and further by plastic coated wires 26a coming out of the switch 22a. As shown in FIG. 2B, as the leading edge 28a of the flow of melt 12a moves over the first end 18a of the pin 16a, it pushes the pin 16a down onto the switch 22a as it flows over the top of the first end 18a of the pin 16a or shortly thereafter. This opens the circuit and breaks a signal that the wires 26a are transmitting. Any number of these systems 10a may be incorporated in various parts of the injection molding machine to monitor and control various aspects of the molding process.

Figure 3:
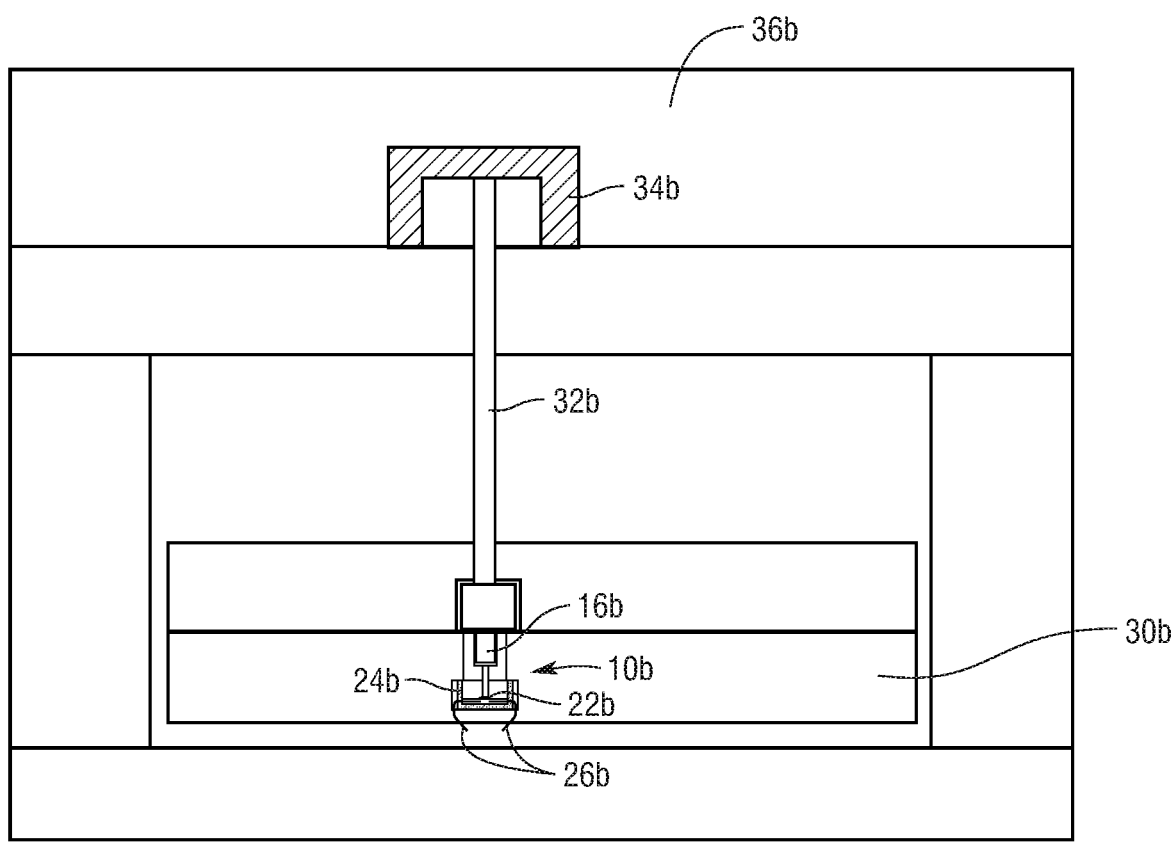
FIG. 3 is a cross-sectional view of the system placed with an ejector assembly.

FIG. 3 shows an embodiment of the system and method that illustrates the system 10b may be placed in contact with another movable element that is within the anticipated flow path of the melt. In this instance the system 10b is placed in the ejector plate 30b of the injection molding machine and the pin 16b is in contact with an ejector pin 32b. The ejector pin 32b is within the cavity 34b of the mold 36b. When melt (not shown) flows into the cavity 34b, the ejector pin 32b is pushed down actuate a switch 22b that performs similarly to the embodiments discussed above. Each of the ejector pins in the injection molding system could have one of these systems 10b to monitor the molding process. In some other embodiments, the pin itself maybe an ejector pin.

Experiment 1

A study was conducted to develop and evaluate the switch actuation system disclosed herein when compared to traditional methods described earlier: injection screw position, cavity pressure, and mold surface temperature. A series of molded parts were formed and the velocity control to pressure control transfer processes ("V/P transfer") were carried out using the three standard methods compared to the disclosed method.

The switch actuation system designed for this study was to be in direct contact with the melt. The following design criteria were established: the switch had to withstand 140 MPa (20,000 psi); the switch must be an electrically isolated internal switch; and the switch must have the same external fit dimensions as commercial pressure sensors. The study concentrated on the V/P transfer process. The standard method to achieve V/P transfer is to use the position of the injection screw and to make the transition when the part is 95-99% full. This method is known to cause variation in the amount of plastic in the mold when the transition takes place which can lead to part quality variation. Examples of defects resulting from this variation include short shots or non-fills, flashing on the finished parts, surface finish variation, and dimensional variation.

Two main sources of V/P transfer variation are check ring shut-off and material viscosity variation. Other transfer methods that are used to reduce this variation are in-mold pressure and temperature sensors. The study compared the switch actuation system to transfer using standard screw position and in-mold sensors (pressure and mold surface temperature). For this study, viscosity was varied by using two different grades of material. Check ring leakage variation was accomplished by using two different decompression strokes. It has been shown that the amount of decompression after screw rotation has a large effect on check-ring leakage.

Part weight was the only metric used in the study to detect variation. It has been shown to be an excellent tool for process analysis. The ability to get very fast and reliable measurements is very advantageous when making many trials. It should be noted however that the weight does not always correlate well to part dimensions or other properties, as can be shown be reducing molecular orientation and/or increasing crystallinity by annealing molded parts, which changes dimensions but not weight.

Two polycarbonate resins were used for the experimental work. Both resins had a solid density of 1.20 g/cm$^3$ and a melt density of 1.03 g/cm$^3$. The melt indices ("MI") for the resins were 24 and 5.5 dg/min (300° C., 1.2 kg). For all experiments, the 24 MI material was used as the low viscosity material and a 5 to 1 mix of the 24 MI to the 5.5 MI materials was used for the high viscosity material. This mix gave a material that was approximately ten percent higher in viscosity than the low viscosity material when molded at the injection velocity used in the study.

The sensor used was a combination piezoelectric cavity pressure transducer and N type thermocouple with a standard 4 mm diameter direct type. The switch was designed with geometry to be a drop-in replacement for pressure transducer and was changed out when needed. The parts were all molded in a 550 kN clamp injection molding machine with a 22 mm diameter screw and 53 cm$^3$ shot capacity. The machine had closed loop velocity and pressure control and the ability to accept an external signal for V/P transfer. All in-mold sensor signals were read by external data collection systems which sent a signal to the molding machine when used for V/P transfer. A digital scale with resolution to the nearest 0.001 gms was used to measure all the parts.

The baseline process set points were first set up with the low viscosity material and 6.4 mm of decompression. Table 1 shows the constant process parameters that were used during the experiment. Before any parts or data were collected the process was given sufficient time to stabilize. The process ran in automatic for a minimum of 30 minutes when first started and until the mold temperature stabilized after occasional process interruptions. This was important to minimize any temperature or residence time effects on the part weight.

TABLE 1

Constant Process Settings.

| Parameter | Setpoint |
| --- | --- |
| Barrel Temperatures (all zones) | 316° C. (600° F.) |
| Mold Cooling Water Temperature | 60° C. (140° F.) |

TABLE 1-continued

Constant Process Settings.

| Parameter | Setpoint |
| --- | --- |
| Shot Size | 38.1 mm (1.5 in) |
| Primary Injection Velocity | 50 mm/s (2 in/sec) |
| Screw Speed | 360 RPM |
| Back Pressure | 0.4 MPa (57 psi) |
| Hold Pressure | 0 |
| Hold Time | 7 sec |
| Cooling Timer | 7 sec |
| Mold Open Time | About 5 seconds (actual) |

The four run, full factorial Design of Experiment ("DOE") shown in Table 2 was run for every combination of injection strategy.

TABLE 2

DOW Set-Up for All Trials

| Run # | Material Viscosity | Decompression |
| --- | --- | --- |
| 1 | Low | 0 |
| 2 | Low | 6.4 mm (0.25 in) |
| 3 | High | 0 |
| 4 | High | 6.4 mm (0.25 in) |

The time on the data acquisition system was noted as the parts were molded so that process curves and summary data could be obtained for results analysis. Five parts (short shots) were collected for each run/injection strategy combination.

For this study, the switch actuation system was connected up in series with a 5-volt DC voltage supply. This was done so that the data collection system could show the type of signal that the switch creates and could be used to delay the V/P transfer after the switch was closed. An alternate method would have been to use a relay timer.

Figure 4:
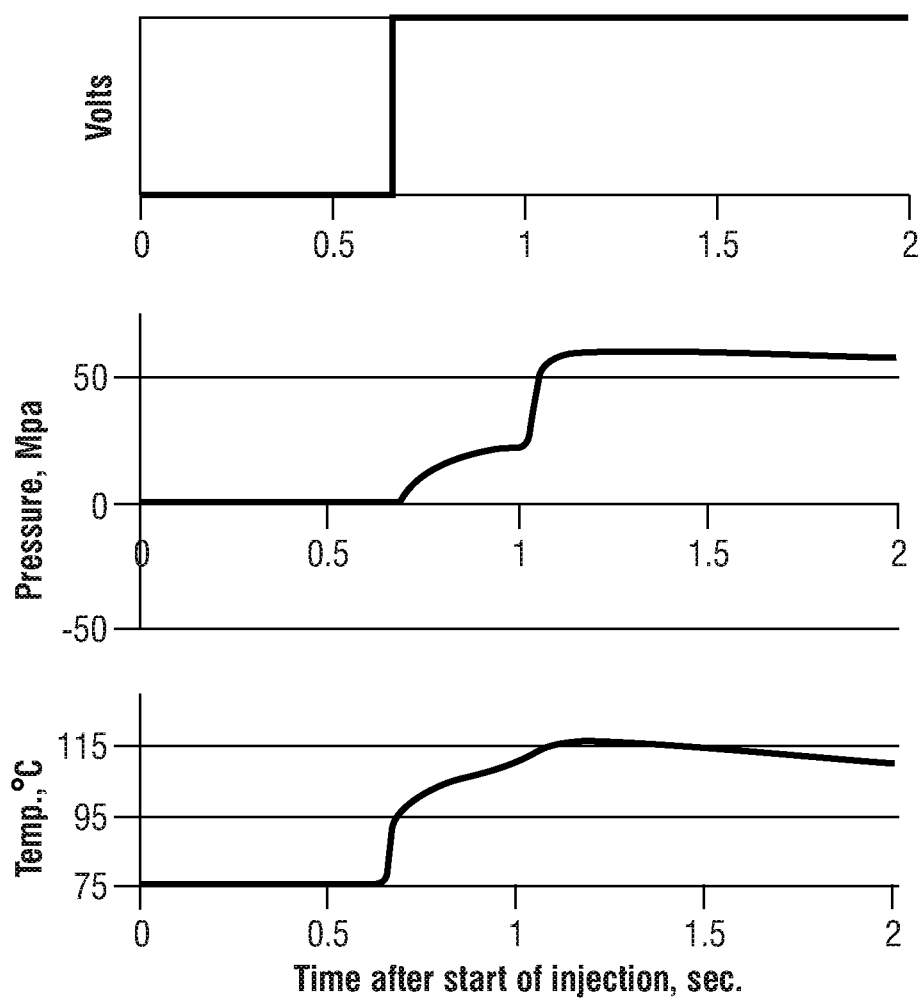
FIG. 4 shows a comparison of the signal output of the switch hooked up to a voltage source to typical outputs from a pressure or temperature sensor.

FIG. 4 graphs the test results with the switch actuation system in the top graph compared to the performance of the pressure sensor (in the middle graph) and the temperature sensor (in the bottom graph). These signals were taken when molding full parts, with hold pressure. Hold pressure was set at zero and short shots were molded for the actual study. It should be noted how both the switch actuation system and mold surface temperature lines immediately spike while the cavity pressure gradually increases when the melt flows over it. This illustrates why pressure does not generally work as effectively as temperature does to detect the position of a melt flow front. When using pressure as an indicator, the changeover pressure is more often based on reaching a pre-set specified value. In contrast, the upper graph shows in the disclosed system that when the switch is actuate, the voltage immediately spikes to whatever the input source is. The voltage typically used for this type of application is 24 volts on an injection molding machine. If using an external data acquisition or control unit, different voltages or merely a contact closure may be required.

For this study, it was found that the best methods to achieve V/P transfer were to use the switch actuation system or the mold surface temperature sensor. The cavity pressure method had the worst performance when the viscosity was varied, and the screw position method had the worst performance with variation in decompression.

Experiment 2

The use of one novel and three well-known injection process strategies were investigated to determine the effect on variation in part weight for each when variation in material viscosity and check ring leakage were introduced to the process. In addition, a comparison was made of the use of traditional screw position, cavity pressure sensing, and the disclosed switch assembly to actuate V/P transfer with each of the processing strategies. Velocity to pressure transfer when the part was not quite full (2-stage, pack with second stage—"2SP2"), after the part was packed with a fast velocity (2-stage, pack with first stage—"2SP1"), and after the part was packed with a slow velocity (3-stage—"3S") were the well-known injection strategies evaluated. The novel strategy was a modified 3-stage ("MOD3S") where the V/P transfer was actuated after the first velocity (as in 2-stage, pack with second stage) and the pack velocity was set as the limit during the first profile of the second stage of injection.

Two of the biggest sources of variation in injection-molded parts are plastic viscosity variation and injection screw check-ring leakage variation. In addition to taking steps to minimize this variation, it is also important to set up processes so that they are as robust as possible to normal viscosity and check-ring or other type of non-return valve variation.

Ways that viscosity variation can be minimized include providing a consistent mix of colorants and other additives, consistent regrind, and consistent temperatures/thermal history as the plastic goes from pellet to molded part. Choosing an optimum injection velocity that will minimize variation in process viscosity when the incoming plastic has a slightly different starting viscosity is also important. Running the proper barrel temperatures and replacing check-rings and/or barrels when worn or damaged is important to minimize check-ring leakage variation. However, some leakage is inevitable when the screw starts to come forward during injection and, it has been found that, the amount of decompression after screw rotation has a large effect on check-ring leakage. Different decompression settings were used to cause different check ring leakage in this study. One of the things that viscosity and/or check ring leakage variation can alter in the process is volume of plastic in the mold when transferring from fill to pack and from pack to hold.

Two polycarbonate resins were used for the experimental work. Both resins had a solid density of 1.20 g/cm$^3$ and a melt density of 1.03 g/cm$^3$. The MI for the resins were 24 and 5.5 dg/min (300° C., 1.2 kg). For all experiments, the 24 MI material was used as the low viscosity material and a 5 to 1 mix of the 24 MI to the 5.5 MI materials was used for the high viscosity material. This mix gave a material that was approximately ten percent higher in viscosity than the low viscosity material when molded at the injection velocity used in this study.

The test molded part was 2 mm thick with two thinner regions on each side of the runner that were 1.3 mm thick. The pressure sensor was a piezoelectric sensor placed directly in the cavity. Two disclosed switch actuators were used in the study with the first switch was directly in the cavity and the second switch was behind an ejector pin.

The piezoelectric cavity pressure transducer was a standard 4 mm diameter direct type. The first switch was designed with geometry to be a drop-in replacement for pressure transducer and was changed out when needed.

The parts were all molded in a 500 kN clamp injection molding machine with a 25 mm diameter screw and 44 cm$^3$ shot capacity. The machine had closed loop velocity and pressure control and the ability to accept an external signal for V/P transfer. The cavity pressure signal was read by an external data collection system which completed a circuit to the molding machine when used for V/P transfer. The data collection system also saved the cavity pressure curve for each cycle. The switch used for V/P transfer was hooked up to a timer relay which, after a delay, completed the circuit to the molding machine. A digital scale with resolution to the nearest 0.001 gms was used to measure all the parts.

The baseline process set points were first set up with the low viscosity material and 6.4 mm of decompression. Table 3 shows the constant process parameters that were used during the experiment. Before any parts or data were collected the process was given sufficient time to stabilize. The process ran in automatic for a minimum of 30 minutes when first started and until the mold temperature stabilized after occasional process interruptions. This was important to minimize any temperature or residence time effects on the part weight.

TABLE 3

Constant Process Settings.

| Parameter | Setpoint |
|---|---|
| Barrel Temperatures (all zones) | 316° C. (600° F.) |
| Mold Cooling Water Temperature | 60° C. (140°F) |
| Shot Size | 61 mm (2.4 in) |
| Primary Injection Velocity | 25 mm/s (1 in/sec) |
| Screw Speed | 300 RPM |
| Back Pressure | 5.5 MPa (800 psi) |
| Hold Pressure | 0 |
| Hold Time | 5 sec |
| Cooling Timer | 6 sec |
| Mold Open Time | About 5 seconds (actual) |

The four run, full factorial DOE shown in Table 4 was run for every combination of injection strategy, and V/P transfer option shown in Table 5. It should also be noted that the pack velocity (2nd controlled velocity) was set at 5.0 mm/sec (0.2 in/sec) for the 3S and MOD3S trials. For the MOD3S process, the 2nd velocity timer was 0.68 seconds. In Table 5, the boxes marked "NA" were not run because the other switch was used.

TABLE 4

DOW Set-Up for All Trials

| Run # | Material Viscosity | Decompression |
|---|---|---|
| 1 | Low | 0 |
| 2 | Low | 6.4 mm (0.25 in) |
| 3 | High | 0 |
| 4 | High | 6.4 mm (0.25 in) |

TABLE 5

V/P set points for each injection strategy/transfer option run (Set-up with low viscosity material).

| Method/Sensor | 2SP1 | 2SP2 | 3S | MOD3S |
|---|---|---|---|---|
| Screw Position | 7.6 mm (0.30 in) | 11.4 mm (0.45 in) | 7.6 mm (0.30 in) | 11.4 mm (0.45 in) |
| Cavity Pressure | 13.9 MPa (2020 psi) | 8.8 MPa (1280 psi) | 20.7 MPa (3000 psi) | 8.8 MPa (1280 psi) |
| Switch 1 Timer Delay | NA | 1.02 sec | 1.70 sec | 1.02 sec |
| Switch 2 Timer Delay | 0 sec | NA | NA | NA |

The time on the data acquisition system was noted as the parts were molded so that process curves and summary data could be obtained for results analysis. The 2SP2 trials were run first with ten parts being collected per run. For the subsequent 2SP1, 3S, and MOD3S trials, five parts were collected since less variation was observed due to the parts being packed (not short shots).

For the material, part geometry, and process set-up conditions used in this study, it was found that the modified 3-stage process reduced variation compared to traditional 3-stage and that the disclosed switch system used to detect the flow front was the most consistent method to actuate V/P transfer. For the 2SP2 and MOD3S process strategies, using the disclosed switch system V/P transfer showed the least variation when the material viscosity and the decompression (check ring leakage) varied. For the 2SP1 injection strategy, using the disclosed switch system V/P transfer or Cavity Pressure V/P transfer showed the least variation when either the material viscosity or the decompression (check ring leakage) varied. For the 2SP2 injection strategy, in-cavity pressure V/P transfer is not effective when viscosity varies. For the 3S injection strategy, all of the transfer methods are sensitive to decompression (check ring leakage) variation. Traditional screw position V/P transfer had significant part weight variation for all four of the process strategies when at least one of the two, viscosity or decompression (check ring leakage), varied. The MOD3S with the disclosed switch system V/P transfer and the 2SP1 with either the disclosed switch system or Cavity Pressure V/P transfer showed no significant part weight variation when either viscosity or decompression (check ring leakage) varied.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

The invention claimed is:

1. A system for determining the position of a flow of melt within an injection molding system, without the use of a pressure sensor, comprising:
   a contact switch;
   a pin that actuates said contact switch;
   said pin has a first end positioned closer to the anticipated flow path of the melt and a second end that is positioned to be in contact with said contact switch; such that when melt enters the anticipated flow path, the melt pushes said pin to close or open said contact switch.

2. The system of claim 1 in which said first end is located within the anticipated flow path of the melt.

3. The system of claim 1 in which said first end is in contact with another movable element that is within the anticipated flow path of the melt.

4. The system of claim 1 in which said pin is an ejector pin.

5. The system of claim 1 in which said pin moves to open or close said contact switch.

6. The system of claim 1 in which said pin is located within a mold-cavity.

7. The system of claim 1 in which said pin is located along a runner system.

8. The system of claim 1 in which closing or opening of said contact switch closes or opens a circuit to trigger an event.

9. The system of claim 1 in which closing or opening of said contact switch closes or opens a circuit to trigger a velocity to pressure transfer.

10. The system of claim 1 in which closing or opening of said contact switch triggers a relay to control outputs from said relay.

11. The system of claim 1 in which closing or opening of said contact switch closes or opens a circuit to trigger opening or closing valve gate pins in a hot runner mold.

12. A method for determining the position of a flow of melt within an injection molding system, without the use of a pressure sensor, comprising:
    locating a pin having a first end and a second end to actuate a contact switch by positioning the first end closer to the anticipated flow path of the melt and the second end in contact with the contact switch such that when melt enters the anticipated flow path, the pin is pushed to close or open said contact switch.

13. The method of claim 12 in which the first end is positioned within the anticipated flow path of the melt.

14. The method of claim 12 in which the first end positioned to be in contact with another movable element that is within the anticipated flow path of the melt.

15. The method of claim 12 in which the pin is an ejector pin.

16. The method of claim 12 in which the pin is located within a mold cavity.

17. The method of claim 12 in which the pin is located along a runner system.

18. The method of claim 12 in which closing or opening of the contact switch closes or opens a circuit to trigger an event.

19. The method of claim 12 in which closing or opening of the contact switch closes or opens a circuit to trigger a velocity to pressure transfer.

20. The method of claim 12 in which closing or opening of said contact switch triggers a relay to control outputs from said relay.

21. The method of claim 12 in which actuation of said contact switch closes or opens a circuit to trigger opening or closing valve gate pins in a hot runner mold.

* * * * *